United States Patent
Besik

Patent Number: 5,645,412
Date of Patent: Jul. 8, 1997

[54] BURNER FOR LOW $NO_x$ MULTISTAGE COMBUSTION OF FUEL WITH PREHEATED COMBUSTION AIR

[76] Inventor: Ferdinand K. Besik, 2562 Oshkin Crt., Mississauga, Ontario, Canada, L5N 3Z3

[21] Appl. No.: 592,652

[22] Filed: Jan. 26, 1996

[51] Int. Cl.$^6$ .................................................... F23D 14/02
[52] U.S. Cl. ........................... 431/115; 431/177; 431/181
[58] Field of Search ............................... 431/115, 177, 431/181, 9, 158, 116, 187

[56] References Cited

U.S. PATENT DOCUMENTS

| | | | |
|---|---|---|---|
| 3,123,127 | 3/1964 | Willott | 431/177 |
| 4,357,134 | 11/1982 | Katsushige et al. | 431/115 |
| 5,271,729 | 12/1993 | Gensier et al. | 431/177 |

FOREIGN PATENT DOCUMENTS

| | | | |
|---|---|---|---|
| 1401762 | 10/1968 | Germany | 431/177 |

*Primary Examiner*—Carroll B. Dority

[57] ABSTRACT

A burner provided for low NOx combustion of fuel with preheated combustion air in a combustion chamber of an industrial furnace and or a steam boiler has a plurality of fuel jets and at least a single air jet arranged to discharge the fuel and the preheated combustion air. The fuel jets and the air jet diverge from one another, provide dilution of fuel with combustion products, and generate multiple precombustion, combustion and post combustion reaction zones in the furnace.

Thus, the burner provides the necessary process conditions and reaction zones required for minimizing the formation of prompt and thermal NOx in the precombustion and combustion reaction zones and for optimizing the decomposition of the formed NOx in the postcombustion reaction zones.

6 Claims, 1 Drawing Sheet

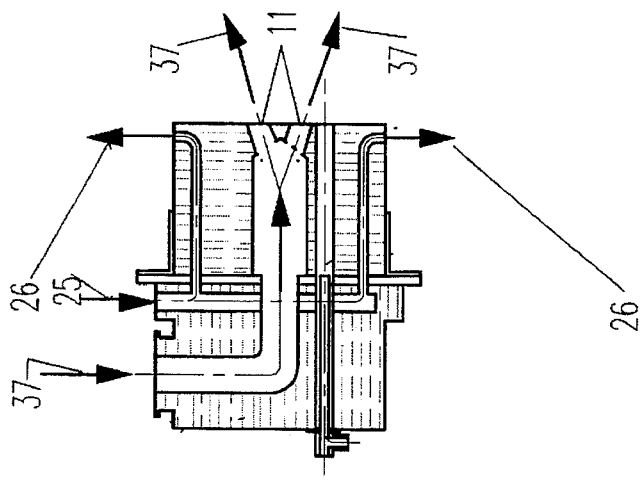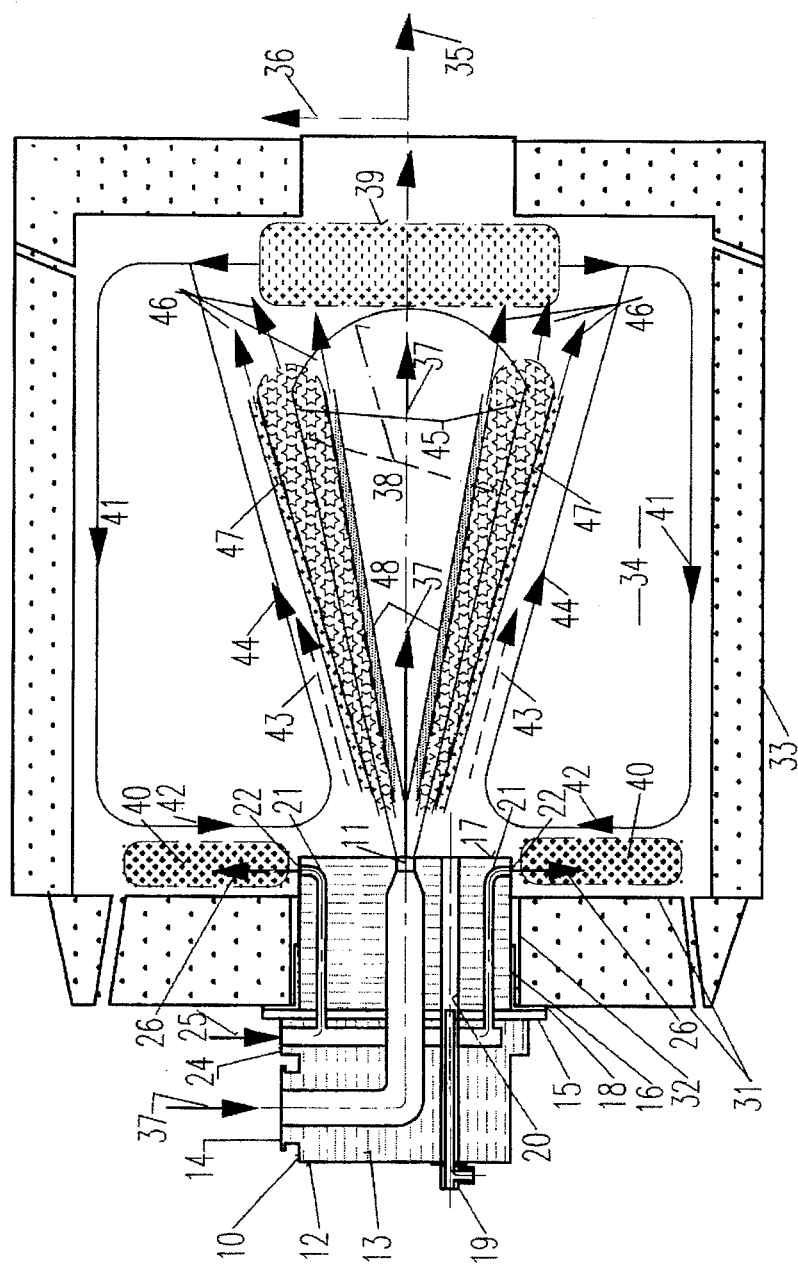

BURNER FOR LOW $NO_x$ MULTISTAGE COMBUSTION OF FUEL WITH PREHEATED COMBUSTION AIR

SPECIFICATION

FIELD OF INVENTION

This invention relates to a burner that provides low emissions of NOx in combustion of fuel with preheated combustion air.

BACKGROUND TO THE INVENTION

Industrial furnaces and steam generators operate at temperatures from 1800 deg. F. to 3000 deg. F., mostly with a gaseous fuel and with combustion air preheated in waste heat regenerators or recuperators up to and above 1500 deg. F. temperatures. The predominant fuel is natural gas burned mostly in diffusion flames. The produced peak flame temperatures cause high emissions of nitric oxide (NO), a product implicated in smog and acid rain problems.

In a typical diffusion flame the fuel and the combustion air discharged from the burner remain separated until brought into intimate contact with one another in a flame zone in the furnace. In a typical low NOx burner the fuel is introduced from a fuel gun located in the centre of the burner as a full cone fuel jet, the combustion air from one or more concentric annual nozzles as hollow cone coaxial air jets enveloping the fuel jet. As a result, several reaction zones are formed in the flame as well as between the flame and the furnace chamber walls.

In a reaction zone formed between the flame and the furnace wall the reactions mostly include the combustion air oxygen and nitrogen and some recirculated combustion products. The occurring reactions are mostly oxidative and are limited by the prevailing temperature which in turn is affected by the radiative thermal energy of the diffusion flame. In the vicinity of the flame there are three reaction zones.

The first—precombustion zone, is a region located on the surface of the fuel jet where the reactions include the fuel just before mixing of the fuel with air. The occurring reactions are mostly pyrolytic, are driven by thermal energy and the reaction products include unsaturated species and particulate nuclei.

The second—flame zone, is a boundary region surrounding the fuel jet. Since fuel is initially separated from the surrounding oxidant, the ratio of the fuel to oxidant in this zone varies in the radial direction from the rich to the lean limit. Regardless of the temperature in this zone, ignition and combustion reactions can occur only after the fuel and the oxidant produce a combustible mixture. Occurring reactions are influenced by the diffusion rates of reactants, by physical processes affecting mixing of the reactants, by heat transfer processes affecting exchange of thermal energy and by the geometry of the flame zone affecting the heat transfer and the residence time of reactants. Reaction products may include particulate as well as atomic, molecular, free radical and anionic gaseous species.

The third—post flame reaction zone, is a region located downstream of the flame zone and is characterized by physical and chemical processes occurring between the reactants. Occurring reactions may be heterogeneous as well as homogeneous, either oxidative or pyrolytic and affect the composition of the combustion products leaving the furnace.

The emission of NOx from combustion systems depends on the quantities of NOx formed and decomposed in the various reaction zones of the diffusion flame and furnace, which depend on the operating conditions of the burner-furnace system. It is generally accepted that formation of NOx in gas fired combustion systems occurs by two mechanisms known as the thermal NO and the prompt NO.

The thermal NO refers to high temperature reactions of nitrogen and oxygen discovered by Zeldovich and is thought to occur mainly in the post flame zone and in the zone between the flame and the furnace walls.

The prompt NO mechanism was first suggested by Fenimore whose measurements showed that some NO is formed at relatively low temperatures in the flame zone through reactions involving radicals C2, C2H, CH and CH2 with air nitrogen and oxygen.

Both NO formation mechanisms are known to depend on the peak flame temperature and on the concentration and residence time of reactants in the reaction zones of the furnace and the described three reaction zones of the diffusion flame.

To minimize formation of NO and to reduce the emission of NOx from combustion systems, numerous studies were devoted to geometries and operating conditions of burners and furnaces. Low excess air firing, flue gas recirculation, fuel and air staging of burners and or furnaces were found to be effective in controlling the formation of the thermal NO, and addition of a suitable diluent to the fuel prior to combustion in controlling the formation of the prompt NO. Still, the prior art burners when operating with high temperature preheated combustion air produce NO at levels requiring expensive post combustion control techniques to meet the late low NOx emission limits.

Therefore, to reduce the emission of NOx from combustion systems operating with preheated combustion air without the need for the expensive post combustion treatment of flue gases, it is the object of the present invention to provide a burner that would operate effectively with fuels and high temperature preheated combustion air and would effectively minimize formation of NOx in the various burner-furnace systems.

It is another object of this invention to improve the geometries of reaction zones in the furnace and in the flame to provide more favourable conditions for the occurring reactions and for minimizing the formation of the prompt NO and the thermal NO.

Another object of the present invention is to provide a burner that would improve the thermal operating conditions and the post combustion reactions in the furnace.

Another object of this invention is to provide a burner that would improve mixing conditions and transmission of unreacted species of hydrogen and carbon monoxide into the post flame reaction zones to improve the destruction of NO therein.

Another object of this invention is to provide a burner that would permit reliable start up and operation of the furnaces and steam boilers from ambient conditions and that would be simple, easy to install and maintain and suitable for retrofitting in furnaces and steam boilers without adversely affecting their heat transfer characteristics.

BRIEF DESCRIPTION OF THE DRAWING

FIG. 1 is a schematic transverse crossectional view of one preferred embodiment of this invention, showing the invented burner with flow patterns and reaction zones in a typical Burner-Furnace System.

FIG. 2 shows a modification of the invented burner in which a plurality of jet is used to replace the single air jet of the embodiment of FIG. 1.

DESCRIPTION OF THE PREFERRED EMBODIMENT

FIG. 1 shows a schematic of a combustion system comprising the invented burner denoted by the numeral 10 and a conventional furnace denoted by 33. The burner 10 comprises a burner tube 12 with thermal insulation 13 and flanges 14, 15, an air nozzle 11, a burner head 17 and a conventional pilot 19.

The conventional peep sight port, flame sensing, pilot and combustion controls, that may be provided with the burner are not shown in FIG. 1, as they are not an object of the present invention.

The burner tube 12 is secured by flange 15 to flange 18 of the casing 16 of the burner head 17. The flange 18 is secured to the outside of the furnace wall 31 with the opening 32 in the furnace wall 31 provided to fit the burner head 17 into the furnace 33.

The burner head 17 is made of castable refractory and has a built in pilot chamber 20, an air nozzle 11 and four symmetrical fuel channels 21 provided with fuel ports 22.

A fuel pipe is connected to a header 24 which is interconnected with the four fuel channels 21 equally spaced around a header 24 and secured to flange 15. Fuel channels 21 are extending through the burner head into the furnace chamber 34.

This invention pertains to burners which burn fuels with preheated combustion air in a combustion system comprising a burner and a furnace and provide conditions for an improved multi step combustion process minimizing the formation of NO in the burner-furnace system as follows.

In the furnace chamber 34 the axial direction is indicated by arrow 35, the radial direction by arrow 36. The preheated combustion air which may contain a portion of recycled flue gases is denoted by arrow 37. It is forced through the burner tube 12 under pressure by an air blower (not shown in FIG. 1) and is discharged from the air nozzle 11 as a long full cone jet 38 axially through the furnace chamber 34.

The gaseous fuel which may also include a diluent gas is denoted by arrow 25. It is forced under pressure through gas pipe 23 and the header 24, then through the fuel channels 21 and fuel ports 22 radially into the furnace chamber 34. The fuel ports 22 provide radial fuel jets 26 that form a primary precombustion reaction zone 40 adjacent to the furnace wall 31.

The primary precombustion reaction zone 40 is providing the first step-pyrolytic decomposition of the fuel 25 to unsaturated species with increasing the total combustible partial pressure of the fuel. In precombustion zone 40 the pyrolytically formed combustibles are mixed with recirculated combustion products indicated by arrows 41. The diluted combustibles 42 are then drawn from the precombustion zone 40 under the influence of the air jet 38 axially through chamber 34 in a hollow cone type stream 43 that is adjacent to the air jet 38 and which moves in the direction of arrows 44.

The air jet 38 and the stream 43 are separated from each other by a hollow cone type flame zone 45 moving axially in the direction of arrows 46 through the furnace chamber 34.

The second precombustion zone 47 is formed between the flame zone 45 and the stream 43 and a first post flame zone 48 is formed between the flame zone 45 and the air jet 38. The second stage pyrolytic decomposition of the diluted combustibles then occurs in the second precombustion zone 47 before the decomposed and diluted combustibles can enter into the flame zone 45.

In the flame zone 45 the presence of particulate nuclei, the increased combustible partial pressure, the reduced concentration of combustibles and oxygen and the large surface area of the hollow cone shape flame zone provide optimum conditions for a) high rate and high efficiency of the occurring oxidation reactions, b) high rate transfer of reaction heat through the furnace chamber to the furnace walls and c) minimum formation of prompt and thermal NO in the vicinity of the flame zone 45 and through the furnace chamber 34.

From the flame zone 45 a portion of formed reactants is transferred through the first post flame zone 48 into the core of the air jet 38 and a portion through the precombustion zone 47 into the stream 43, with the rest being transferred downstream in the direction of arrows 46.

The remainders of streams 43 and 37 eventually unites to form the second post flame reaction zone 39 located downstream of the air jet 38 in furnace chamber 34 occupied by a mixture of diluted pyrolytically decomposed fuel, combustion products and the residual air oxygen. The reactions that occur here at the very low concentration of oxygen include mainly the pyrolytically decomposed fuel and combustion products.

The acting forces of the air jet 38 cause internal recirculation of combustion products within the furnace chamber 34 as indicated by arrows 41, thus equalizing the operating temperature within the furnace chamber 34.

It can be appreciated, that the required fuel jets 26 can be conveniently provided by other means such as a single fuel ring tube provided with the radial fuel ports or other means that would provide similar fuel distribution pattern in the furnace chamber 34 as described herein.

It can be also appreciated, that the described single air jet cone effect can be provided by a multiple air jets as shown in FIG. 2 which may be more practical for some specific applications or for the large industrial furnaces and boilers, with the individual air jets being oriented axially, or at a suitable angle off the axial direction of the burner.

What has been described as an invention in a combustion system is a burner that provides an air fuel distribution pattern permitting a specific sequence of reaction zones to be formed in a furnace chamber that allow to carry out a multi step combustion process minimizing the formation of the prompt and the thermal NO in a combustion system regardless of the combustion air preheat temperature. More specifically the invention concerns a burner providing:

- internal recirculation of combustion products by a single and or multiple air jet stream of preheated combustion air,
- a primary precombustion reaction zone for pyrolytic decomposition of the fuel,
- mixing of the pyrolytically decomposed fuel with combustion products and dilution of the concentration of combustibles,
- a second precombustion reaction zone formed in the vicinity of a conical diffusion flame to complete the pyrolytic reactions,
- a large surface area combustion reaction zone for oxidation of the diluted pyrolytically decomposed fuel,
- a first post flame reaction zone formed in the vicinity of the flame for completion of post flame reactions,
- a second post flame reaction zone formed down stream of the air jet (jets) for completion of post flame reactions and for the reduction of the NO formed in the combustion zone and in the first post flame reaction zone.

Although only a single embodiment of the invention has been described, it is understood that changes or modifications can be made to the described basic elements of the burner system including the burner tube, burner head, air nozzle, air jet, fuel ports, pilot and combustion controls and that various types of diluents may be used with the combustion air and or fuel to affect the described combustion process reactions.

It is understood that the presented description of the burner-furnace combustion system is illustrative only and not for the purpose of rendering this invention limited to the details illustrated or described except insofar as they are limited by the terms of the following claims.

SUMMARY OF THE INVENTION

It is a primary object of this invention to provide a family of burners operating with preheated combustion air which would minimise the formation of nitric oxide in combustion systems comprising a burner and a combustion chamber.

In the described embodiment of a generic burner of this invention the preheated combustion air passes through a burner pipe and a nozzle to be discharged as a single air jet through the furnace combustion chamber.

A plurality of fuel ports provide fuel jets injecting the fuel radially into the furnace combustion chamber forming first precombustion zone located in the front section of the combustion chamber. Here in the absence of oxygen and nitrogen the fuel is decomposed to unsaturated species and particulate nuclei by the radiation heat energy, thus increasing the combustion partial pressure without formation of NO.

The decomposed fuel is then drawn by the action of the air jet with a portion of recirculated combustion products from the first precombustion zone and as a thin gaseous layer wrapped around the air jet it is forming a large thin layer combustion reaction zone on the surface of the air jet to carry out the oxidation of combustibles formed in the precombustion zone with minimum formation of NO.

To further minimise the formation of NO at high furnace operating temperatures, flue gases may be added to the combustion air to reduce the concentration of oxygen in the air jet.

I claim:

1. A burner for minimizing the formation of NOx in combustion of fuel with preheated combustion oxidant in a furnace system comprising:

a furnace for combustion of said fuel with said preheated combustion oxidant in a furnace chamber, said furnace chamber having a longitudinal axis and including a front wall at a first end thereof with an opening for a burner therein, side walls and an end wall at a second end thereof and said furnace having an exit opening located in said second end wall for discharging of combustion products out of said furnace, and a burner including a burner head means mounted in said opening of said front wall of said furnace chamber in the vicinity of said longitudinal axis and including means for discharging fuel radially adjacent said front wall of said furnace chamber and means for discharging oxidant into said furnace chamber toward said second end wall of said furnace chamber and at an angle diverging from said discharged fuel to provide recirculation of combustion products in said furnace chamber and drawing pyrolytically decomposed fuel from a precombustion zone located adjacent said discharged fuel and mixing said pyrolytically decomposed fuel with combustion products to provide dilution of said pyrolytically decomposed fuel and transporting said diluted pyrolytically decomposed fuel through a multiple of combustion reaction zones formed in said furnace chamber to achieve a multistage combustion of said diluted pyrolytically decomposed fuel with said oxidant with minimum formation of NOx therein and discharging said combustion products out of said furnace chamber.

2. A burner as claimed in claim 1, wherein said burner head means includes fuel discharge means arranged to provide a plurality of fuel jets diverging from said discharged oxidant.

3. A burner as claimed in claim 1 wherein said oxidant discharge means provides a single oxidant jet diverging from said discharged fuel.

4. A burner as claimed in claim 1, wherein said oxidant discharge means provides a plurality of oxidant jets diverging from said discharged fuel.

5. A burner as claimed in claim 2, wherein said oxidant discharge means provides a single oxidant jet diverging from said discharged fuel.

6. A burner as claimed in claim 2, wherein said oxidant discharge means provides a plurality of oxidant jets diverging from said discharged fuel.

* * * * *